(12) United States Patent
Kim et al.

(10) Patent No.: US 9,434,383 B2
(45) Date of Patent: Sep. 6, 2016

(54) INTEGRATIVE METHOD AND SYSTEM FOR CONTROLLING BLIND SPOT DETECTION SYSTEM AND LANE KEEPING ASSIST SYSTEM

(71) Applicant: Hyundai Motor Company, Seoul (KR)

(72) Inventors: Jong Chul Kim, Suwon-si (KR); Yon Jun Jang, Changwon-si (KR); Hoi Won Kim, Gwacheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/731,240

(22) Filed: Jun. 4, 2015

(65) Prior Publication Data

US 2016/0152234 A1    Jun. 2, 2016

(30) Foreign Application Priority Data

Dec. 1, 2014  (KR) ........................ 10-2014-0169829

(51) Int. Cl.
| | | |
|---|---|---|
| *B62D 6/00* | (2006.01) | |
| *B60W 30/09* | (2012.01) | |
| *B60W 10/20* | (2006.01) | |
| *B60W 10/18* | (2012.01) | |
| *B60W 40/105* | (2012.01) | |
| *B60W 40/114* | (2012.01) | |
| *B60W 30/12* | (2006.01) | |

(52) U.S. Cl.
CPC ............ *B60W 30/09* (2013.01); *B60W 10/18* (2013.01); *B60W 10/20* (2013.01); *B60W 30/12* (2013.01); *B60W 40/105* (2013.01); *B60W 40/114* (2013.01); *B60W 2710/18* (2013.01); *B60W 2710/20* (2013.01); *B60W 2750/308* (2013.01)

(58) Field of Classification Search
CPC .... B60W 30/09; B60W 10/18; B60W 10/20; B60W 30/12; B60W 40/105; B60W 40/114
See application file for complete search history.

(56) References Cited

U.S. PATENT DOCUMENTS

| | | | | |
|---|---|---|---|---|
| 7,899,621 | B2 * | 3/2011 | Breed ................. | B60N 2/2863 340/995.1 |
| 8,031,063 | B2 * | 10/2011 | Schmitz ............... | B60K 31/047 340/439 |
| 8,232,872 | B2 * | 7/2012 | Zeng .................... | G06K 9/6293 340/425.5 |
| 8,849,516 | B2 | 9/2014 | Lazic et al. | |
| 8,874,301 | B1 * | 10/2014 | Rao ....................... | B60K 28/066 180/272 |
| 9,279,670 | B2 * | 3/2016 | Schommer ............. | G01S 7/40 |
| 2006/0287828 | A1 * | 12/2006 | Lehner .................. | G08G 1/167 701/301 |
| 2007/0222662 | A1 * | 9/2007 | Toennesen ............. | G01S 13/48 342/27 |
| 2008/0109134 | A1 * | 5/2008 | Bolourchi ............. | B62D 6/002 701/41 |

(Continued)

FOREIGN PATENT DOCUMENTS

| | | | | |
|---|---|---|---|---|
| JP | 2008123112 A | * | 5/2008 | ............... G08G 1/16 |
| JP | 2008-273360 A | | 11/2008 | |

(Continued)

*Primary Examiner* — Calvin Cheung

(74) *Attorney, Agent, or Firm* — McDermott Will & Emery LLP

(57) ABSTRACT

An integrative control system and a method for controlling a blind spot detection system (BSDS) and a lane keeping assist system (LKAS) for stable driving of a vehicle are provided, in which, when the vehicle is deviated from its lane and another vehicle is positioned in a blind spot, an estimated lateral distance is calculated using time-to-collision, and side brake control by the ABSD system and steering angle control by the LKAS are performed based on the estimated lateral distance.

12 Claims, 4 Drawing Sheets

(56) References Cited

U.S. PATENT DOCUMENTS

| | | | | |
|---|---|---|---|---|
| 2009/0147083 A1* | 6/2009 | Pawlicki | | G06K 9/4604 348/119 |
| 2010/0004821 A1* | 1/2010 | Buerkle | | B62D 15/025 701/41 |
| 2012/0019375 A1* | 1/2012 | Kataoka | | B60W 50/14 340/439 |
| 2012/0212353 A1* | 8/2012 | Fung | | B60K 28/06 340/905 |
| 2013/0085975 A1* | 4/2013 | Wellhoefer | | B60R 21/0134 706/46 |
| 2014/0125474 A1* | 5/2014 | Gunaratne | | G08G 1/163 340/439 |
| 2014/0184399 A1* | 7/2014 | Lim | | G08G 1/167 340/435 |
| 2015/0183430 A1* | 7/2015 | Schwindt | | B60W 30/12 701/23 |
| 2015/0251667 A1* | 9/2015 | Lu | | B60W 50/16 701/53 |
| 2015/0321699 A1* | 11/2015 | Rebhan | | B60Q 9/00 701/23 |

FOREIGN PATENT DOCUMENTS

| | | |
|---|---|---|
| JP | 2010-023756 A | 2/2010 |
| JP | 2012-232704 A | 11/2012 |
| JP | 2013-233930 A | 11/2013 |
| KR | 10-2012-0055013 A | 5/2012 |
| KR | 10-1188491 B1 | 10/2012 |
| KR | 10-2014-0060107 A | 5/2014 |
| KR | 10-2014-0079104 A | 6/2014 |

* cited by examiner

INTEGRATIVE METHOD AND SYSTEM FOR CONTROLLING BLIND SPOT DETECTION SYSTEM AND LANE KEEPING ASSIST SYSTEM

CROSS-REFERENCE TO RELATED APPLICATION

This application is based on and claims the benefit of priority to Korean Patent Application No. 10-2014-0169829, filed on Dec. 1, 2014 in the Korean Intellectual Property Office, the disclosure of which is incorporated herein in its entirety by reference.

TECHNICAL FIELD

The present disclosure relates to an integrative system and a method for controlling a blind spot detection system (BSDS) and a lane keeping assist system (LKAS) for stable driving of a vehicle.

BACKGROUND

Generally, blind spot detection system (BSDS) has a sensor on a side of a vehicle to detect blind spot behind. For example, the BSDS can recognize presence or absence of an object in the blind spot through a radar sensor installed on a side of the vehicle. When determining the presence of an object in the blind spot, the BSDS notifies the presence to a driver and issues predetermined command to a control device of the vehicle to perform driving control for safe vehicle driving.

The lane keeping assist system (LKAS) automatically keeps the vehicle from deviating from its lane during driving. The LKAS can recognize white lane, central lane, etc., with a sensor such as an image sensor. When detecting that the vehicle is deviating from its lane, the LKAS notifies it to the driver by vibrating the steering wheel or generating alarm sound, and also automatically steers the steering wheel so that the vehicle stays on course.

In a vehicle having both the BSDS and LKAS, both the side brake control by the BSDS and the steering control by the LKAS can be performed simultaneously to achieve the systems' respective purposes. The BSDS and the LKAS operate based on separate driving conditions or standards.

However, because both of the systems operate according to separate driving conditions or standards even in a situation where the stable control of the vehicle is achieved with the LKAS alone, the side brake control by the BSDS can cause rapid change in the vehicle's steering and velocity, which can lead into excessive control that exceeds the center of the road. Accordingly, stable driving of the vehicle, or more specifically, the lateral stability of the vehicle can be considerably compromised.

SUMMARY

The present disclosure has been made to solve the above-mentioned problems occurring in the prior art while advantages achieved by the prior art are maintained intact.

An aspect of the present disclosure provides integrative control system and method, which calculate an estimated lateral distance using time-to-collision when a vehicle is deviated from its lane and another vehicle is positioned in blind spot, and control a side brake control by an active blind spot detection (ABSD) system and a steering angle control by a lane keeping assist system (LKAS), based on the estimated lateral distance.

According to an exemplary embodiment of the present disclosure, an integrative control system may include a driving system configured to perform steering and driving of a vehicle, a blind spot detection (BSD) module configured to calculate a time-to-collision against another vehicle, when said another vehicle is positioned in a blind spot, a lane keeping assist (LKA) module configured to monitor whether or not the vehicle is deviated from a lane, and send a steering angle control command to the driving system when the vehicle is deviated from the lane, and an integrative control module configured to calculate an estimated lateral distance when the vehicle is deviated from the lane and said another vehicle is positioned in the blind spot, by using the time-to-collision, and when the estimated lateral distance is equal to or greater than a predetermined value, cause the BSD module to send a side brake control command to the driving system and cause the LKA module to send the steering angle control command to the driving system.

According to an exemplary embodiment, when the estimated lateral distance is less than the predetermined value, the integrative control module may cause the LKA module to send the steering angle control command to the driving system.

According to an exemplary embodiment, the BSD module may send the side brake control command to the driving system through an electronic stability control (ESC) module.

According to an exemplary embodiment, the LKA module may send the steering angle control command to the driving system through a motor driven power steering (MDPS) module.

According to an exemplary embodiment, the integrative control module may calculate the estimated lateral distance using the time-to-collision, velocity of the vehicle, heading angle of the vehicle, yaw-rate of the vehicle, and curvature of the lane.

According to an exemplary embodiment, the BSD module may calculate the time-to-collision against said another vehicle, only when velocity of the vehicle is equal to or greater than a predetermined velocity.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

The present disclosure may have various modifications and embodiments, and therefore, certain embodiments will be illustrated and described in detail in the Detailed Description. However, it should be understood that the present disclosure is not limited to any specific embodiment, but encompasses all the modifications, equivalents or substitutes that fall under the concept and technical scope of the present disclosure. In describing the present disclosure, detailed description of known technologies may be omitted when such can obscure the subject matter of the present disclosure.

Terminologies used throughout the present disclosure are used to describe specific embodiments only, but do not intend to limit the present disclosure. Unless they have obviously different meaning based on the context, the singular expressions encompass plural expressions. Herein, wording such as "comprise" or "have" intends to designate existence of characteristics, numbers, elements, components or a combination thereof as described herein, but not to be understood as foreclosing existence or possibility of addition of one or more of another characteristics, numbers, elements, components or combinations thereof.

Figure 1:
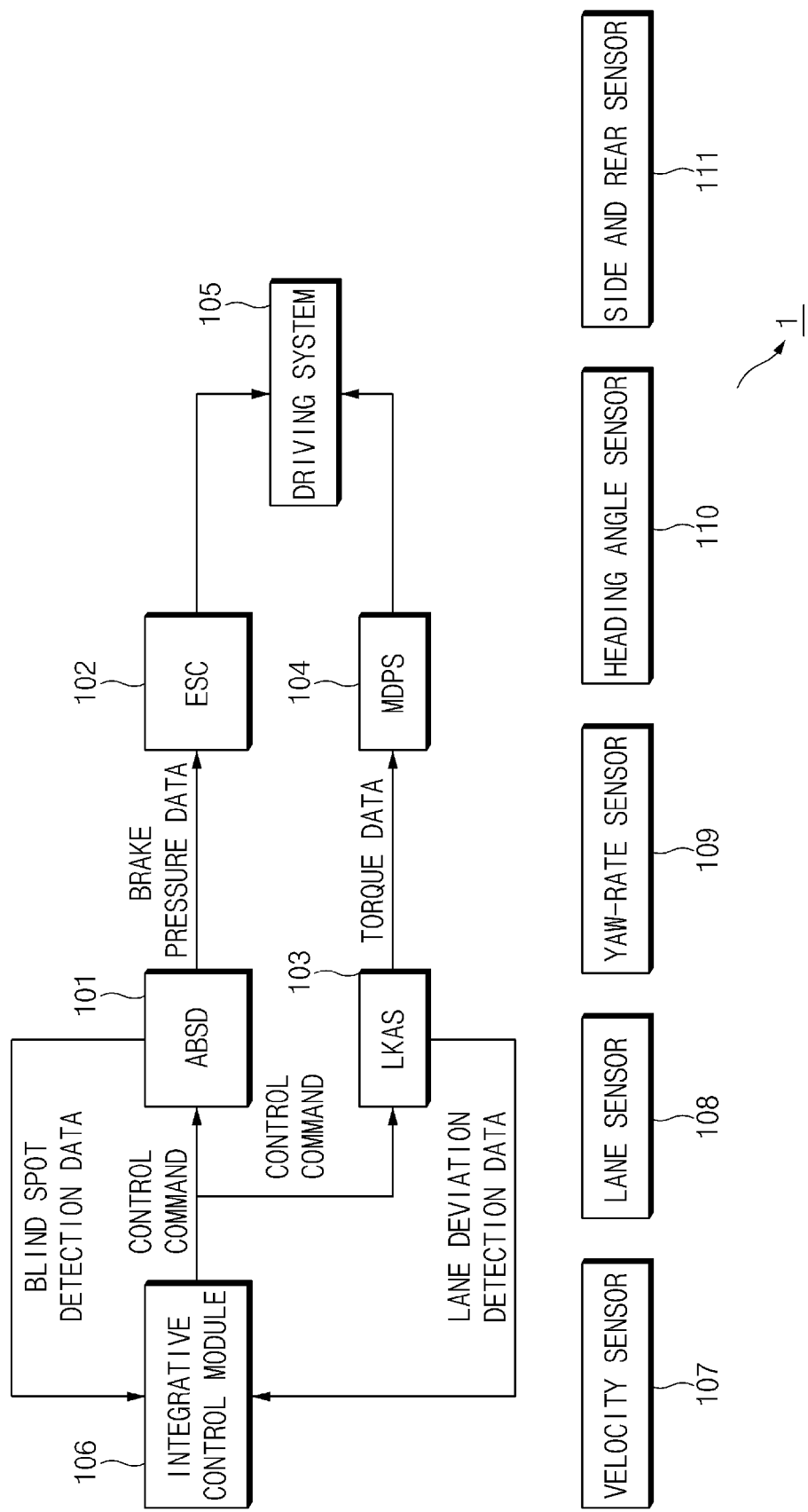
FIG. 1 is a block diagram of an integrative control system according to an exemplary embodiment of the present disclosure.

FIG. 1 is a block diagram of an integrative control system according to an exemplary embodiment of the present disclosure.

Referring to FIG. 1, an integrative control system 1 according to an exemplary embodiment of the present disclosure includes an active blind spot detection (ABSD) system 101, an electronic stability control (ESC) module 102, a lane keeping assist system (LKAS) 103, a motor driven power steering (MDPS) module 104, a driving system 105, an integrative control module 106, and various sensors 107 to 111.

The ABSD system 101 may be connected to a side and rear sensor 111 to detect presence of nearby vehicles or objects. When another vehicle or object approaches the blind spot which is visually unrecognizable for a driver who is using a side mirror, the ABSD system 101 may recognize this, based on, for example, the detection results of the side and rear sensor 111, and notify to the driver.

Further, when another vehicle or object approaches the blind spot, the ABSD system 101 may provide the ESC module 102 with brake pressure data. Thereby, possible collision with another vehicle or object in the blind spot can be avoided. The ABSD system 101 may also be referred herein as a 'BSD module' or 'BSD system'.

Meanwhile, when another vehicle is in the blind spot, the ABSD system 101 may calculate time-to-collision ($\tau$) based on a distance to said another vehicle and relative velocity. For example, the ABSD system 101 may calculate the time-to-collision ($\tau$) by dividing the distance to said another vehicle acquired from the side and rear sensor 111 by the relative velocity of the another vehicle acquired from the side and rear sensor 111.

Depending on embodiments, the ABSD system 101 may calculate the time-to-collision ($\tau$) against said another vehicle, only when the vehicle is driving above a predetermined velocity (e.g., above 60 KPH).

The ESC module 102 may cause the side brake to be applied on the driving system 105 according to the brake pressure data received from the ABSD system 101. That is, the side brake control command may be sent to the driving system 105 through the ESC module 102. When the side brake is applied on the driving system 105, the brake may be applied on the wheels of the vehicle so that it is possible to avoid the collision with said another vehicle or object.

The LKAS 103 prevents deviation of the vehicle from its lane by varying the detected lane data into torque value. For example, the LKAS 103 may monitor whether or not the vehicle deviates from its lane using lane sensor 108. When the vehicle deviates from its lane, the LKAS 103 may send the torque data to prevent lane deviation to the MDPS module 104. Accordingly, safe driving can be achieved because the vehicle can return to the original lane instead of deviating from the lane. Meanwhile, the LKAS 103 may also be referred to herein as a 'LKA module'.

The MDPS module 104 may cause the driving system 105 to change steering angle according to the torque data received from the LKAS 103. That is, the steering angle control command may be sent to the driving system 105 via the MDPS module 104. Lane deviation can thus be prevented by the proper change of the steering angle of the driving system 105.

The driving system 105 may include overall driving-related components, including, steering device including engine, steering wheel, transmission, vehicle wheels, differential system, or the like. The driving system 105 may perform overall operations related with driving of the vehicle (acceleration and deceleration), steering, etc.

The integrative control module (or device) 106 may integratively control the operations of the ABSD system 101 and the LKAS 103. The integrative control module 106 may receive from the ABSD system 101 data as to whether or not another vehicle or the like is detected in the blind spot, and receive from the LKAS 103 data as to whether or not lane deviation is detected.

When the vehicle deviates from its lane and another vehicle is in the blind spot, the integrative control module 106 may calculate an estimated lateral distance ($y_{estimated}$) (i.e., in a direction across the road), based on the time-to-collision calculated by the ABSD system 101 and data obtained from the various sensors 107 to 111.

For example, the estimated lateral distance ($y_{estimated}$) may be calculated by Mathematical Equation 1 as below.

$$y_{Estimated}=y+v\theta\tau+\tfrac{1}{2}v\gamma\tau^2-\tfrac{1}{2}v^2\rho\tau^2 \quad \text{[Mathematical Equation 1]}$$

where, y: current distance of lateral deviation by the driver's own vehicle from center of the road,
  v: velocity of the driver's own vehicle,
  $\theta$: heading angle of the driver's own vehicle,
  $\tau$: estimated time-to-collision,
  $\rho$: curvature of lane,
  $\gamma$: yaw-rate of the driver's own vehicle.

Accordingly, estimated lateral distance ($y_{estimated}$) can be calculated using time-to-collision ($\tau$), velocity (v) of vehicle, heading angle ($\theta$) of vehicle, yaw-rate ($\gamma$) of vehicle, and curvature ($\rho$) of vehicle, which are calculated at the ABSD system 101. Each of the parameters used in the above calculation may be obtained from the various sensors 107 to 111 which will be explained below, for example.

Then, when the estimated lateral distance ($y_{estimated}$) is equal to or greater than a predetermined value (e.g., 0), the integrative control module 106 causes the ABSD system 101 to send side brake control command to the driving system 105, and causes the LKAS 103 to send steering angle control command to the driving system 105.

That is, when $y_{Estimated} \geq 0$, the integrative control module 106 may perform side brake control and steering control of the vehicle, using both the ABSD system 101 and the LKAS 103.

Meanwhile, when the calculated estimated lateral distance ($y_{estimated}$) is less than the predetermined value (e.g., 0), the integrative control module 106 may only cause the LKAS 103 to send the steering angle control command to the driving system 105.

That is, when $y_{Estimated} < 0$, the integrative control module 106 may perform steering control of the vehicle, using LKAS 103 alone.

The various sensors 107 to 111 may detect each of the parameter values that are necessary for the calculation of the estimated lateral distance ($y_{estimated}$). Therefore, the various sensors 107 to 111 may include, for example, a velocity sensor 107, a lane sensor 108, a yaw-rate sensor 109, a heading angle sensor 110, and a side and rear sensor 111.

The velocity sensor 107 may detect the velocity of the driver's own vehicle.

The lane sensor 108 may detect types of the lane (e.g., general lane, center lane), location of the lanes, curvature of the lane, rate of change of curvature of the lane, or a distance by which the driver's own vehicle is deviated laterally from the center of the road, by recognizing the lanes on both sides of the road on which the vehicle is running with image processing or the like. The distance of lateral deviation from the center of the road may be obtained based on the lateral distances to the lanes on both sides of the road.

The yaw-rate sensor 109 may detect the yaw-rate ($\gamma$) of the vehicle. The yaw-rate represents the rate of change in the angle of the vehicle's travel according to time. For example, when the vehicle deviates by 2° from the driving direction (0°) of the road in 1 second, the yaw-rate is 2°/sec.

The heading angle sensor 110 may detect the heading angle of the vehicle. The heading angle may represent the angle of the actual direction of travel of the vehicle, when the driving direction of the road is 0°.

The side and rear sensor 111 may measure distance to the adjacent vehicle and relative velocity. For example, the side and rear sensor 111 may send out a predetermined radio (or acoustic) wave with respect to the adjacent vehicle and detect the reflected radio (or acoustic) wave that corresponds to the predetermined radio (or acoustic) wave.

For example, the side and rear sensor 111 may obtain the distance to the adjacent vehicle by multiplying the velocity of the predetermined radio (or acoustic) wave by the time between emission of the predetermined radio (or acoustic) wave and detection of the reflected radio (or acoustic) wave. Further, the side and rear sensor 111 may also measure the relative velocity of the adjacent vehicle, by analyzing the frequency of the reflected radio (or acoustic) wave that is changed according to the Doppler effect.

In one exemplary embodiment, the side and rear sensor 111 described above measures the relative velocity, but not limited thereto. Accordingly, the relative velocity may be measured (or calculated) by the ABSD system.

The side and rear sensor 111 may be implemented as an ultrasonic sensor (not illustrated), a radar sensor, a laser radar sensor, or an infrared sensor. Further, there may be a plurality of side and rear sensors 111 which may be provided on the sides and/or rear side of the vehicle.

As described above, the various sensors 107 to 111 may be connected to, for example, a variety of configurations included in the driving system 105, to detect various data. Further, various data detected from the various sensors 107 to 111 described above may be provided to, for example, the ABSD system 101, the LKAS 103 and the integrative control module 106.

Figure 2:
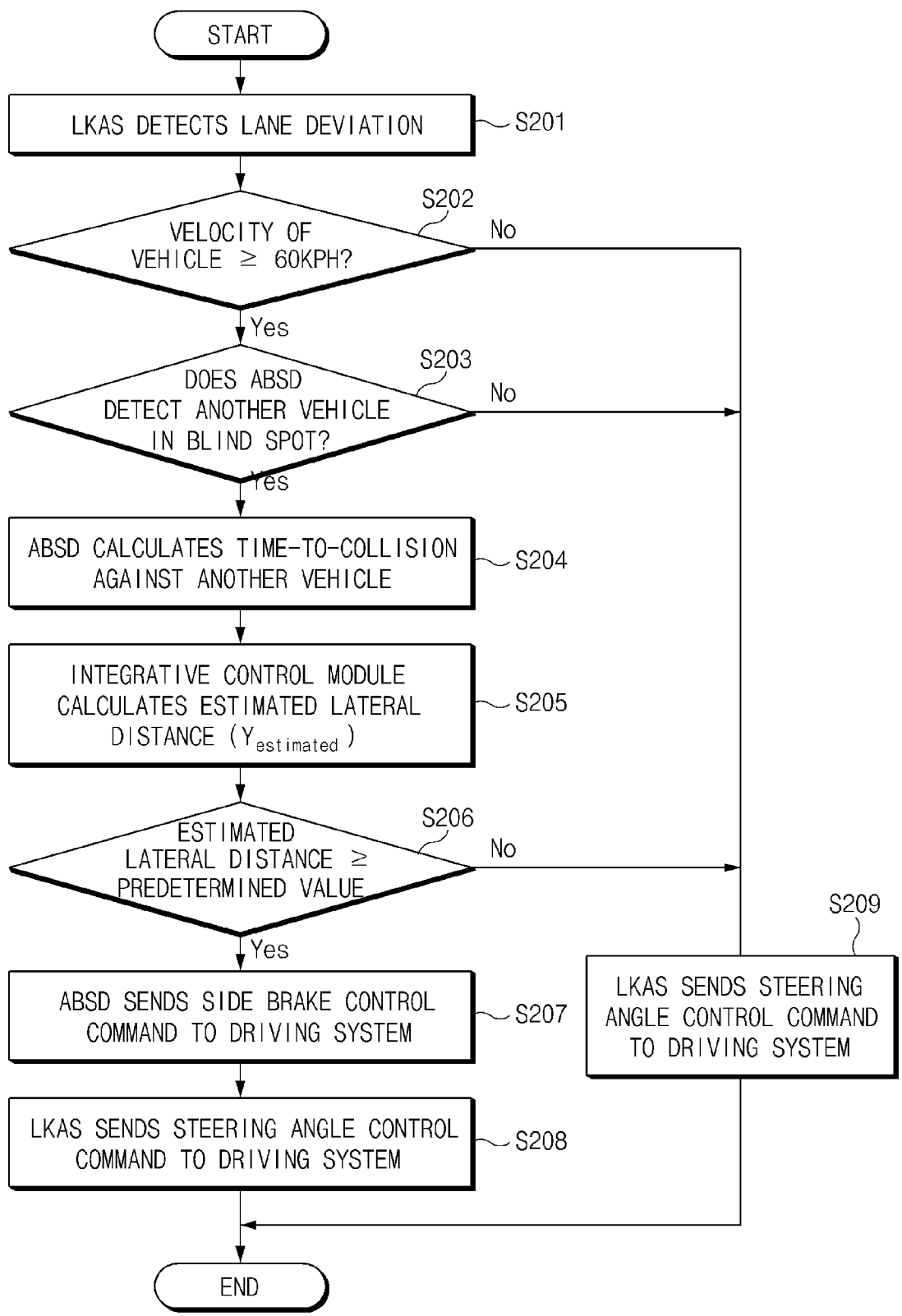
FIG. 2 is a flowchart of an integrative control method according to an exemplary embodiment of the present disclosure.

FIG. 2 is a flowchart of an integrative control method according to an exemplary embodiment of the present disclosure.

Referring to FIG. 2, a method for integratively controlling BSD system and LKAS mounted to a vehicle according to an exemplary embodiment of the present disclosure may include steps 201 to 209.

At step 201, the LKAS 103 may detect deviation of the vehicle from its lane, by using the lane sensor 108.

At step 202, the ABSD system 101 may determine if the velocity of the vehicle is equal to or greater than a predetermined speed, for example 60 KPH, by using the velocity sensor 107. When the velocity of the vehicle is equal to or greater than the predetermined speed, the operation moves on to step 203 for the ABSD system 101 to operate. Otherwise, the operation moves on to step 209.

At step 203, the ABSD system 101 may detect and determine, by using the side and rear sensor 111 for example, if there is another vehicle positioned in the blind spot. The operation moves on to step 204 when detecting another vehicle in the blind spot, or otherwise, the operation moves on to step S209.

At step 204, the ABSD system 101 may calculate the time-to-collision ($\tau$) against the above-mentioned another vehicle, based on the velocity and distance of the another vehicle.

At step 205, the integrative control module 106 may calculate the estimated lateral distance ($y_{estimated}$). The estimated lateral distance ($y_{estimated}$) may be calculated using time-to-collision ($\tau$) calculated at step 204, velocity (v) of vehicle detected from the velocity sensor 107, heading angle ($\theta$) of vehicle detected from the heading angle sensor 110, yaw-rate ($\gamma$) of vehicle detected from the yaw-rate sensor 109, and curvature ($\rho$) of lane detected from the lane sensor 108.

At step 206, the integrative control module 106 may determine if the estimated lateral distance ($y_{estimated}$) is equal to or greater than a predetermined value (e.g., 0). When the estimated lateral distance ($y_{estimated}$) is equal to or greater than the predetermined value (e.g., 0), the operation moves on to step 207, or otherwise, the operation moves on to step 209.

At step 207, the integrative control module 106 may control the ABSD system 101 to send the side brake control command to the driving system 105 through the ESC module 102. Although not illustrated in the drawings, according to other embodiments of the present disclosure, step 206 and step 207 may be performed simultaneously.

At step 208, the integrative control module 106 may control the LKAS 103 to send the steering angle control command to the driving system 105 through the MDPS module.

At step 209, the integrative control module 106 may control the LKAS 103 to send the steering angle control command to the driving system 105 through the MDPS module.

According to exemplary embodiments, it is possible to prevent rapid change in the steering and velocity of the vehicle. As a result, excessive control that exceeds the center of the road is prevented, and lateral driving stability of the vehicle is further enhanced. The above effects of the present disclosure will be explained in detail below with reference to FIGS. 3 and 4.

Figure 3:
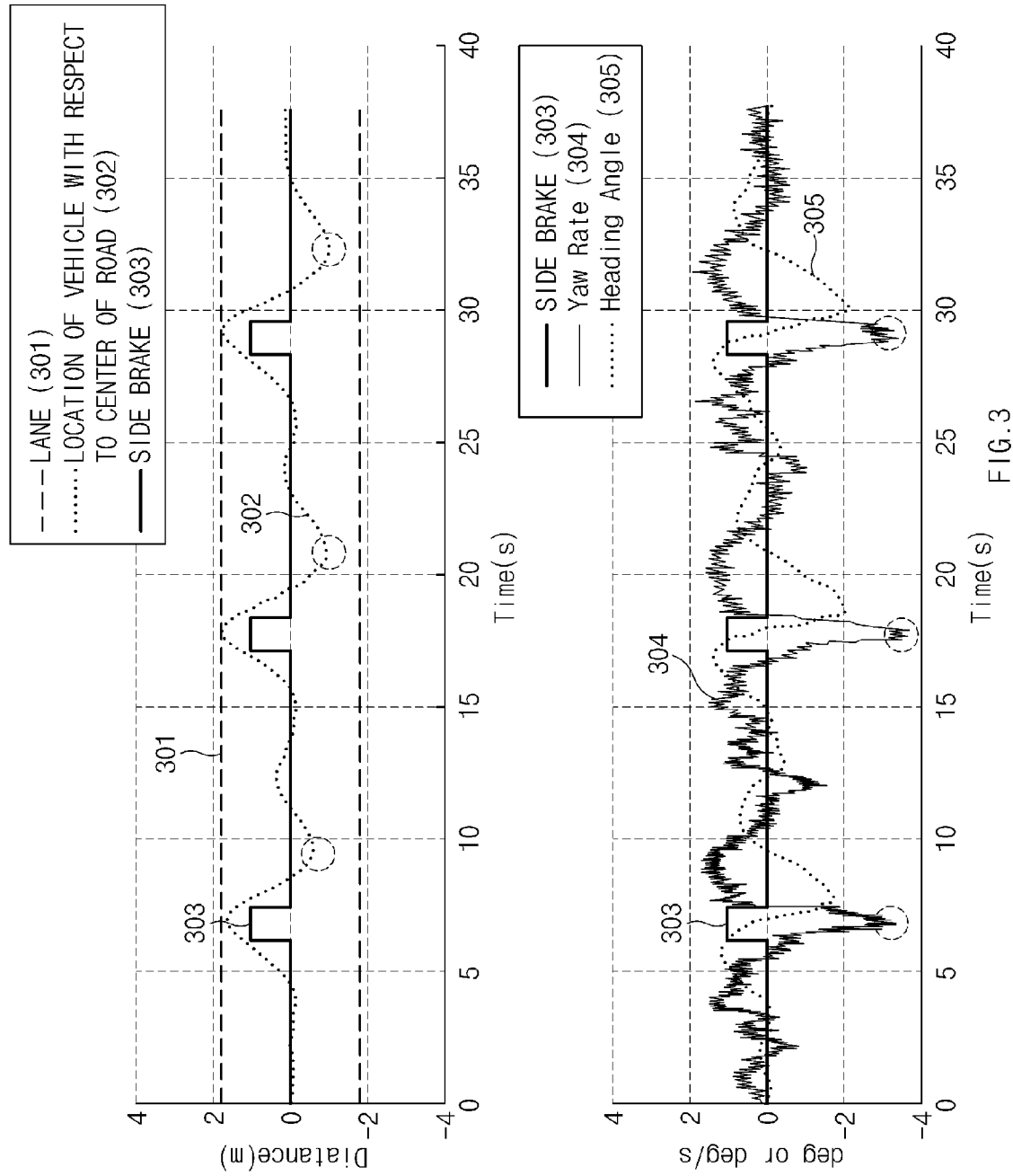
FIG. 3 is a view provided to explain a conventional vehicle control.

FIG. 3 is a view provided to explain conventional vehicle control.

Referring to upper graph in FIG. 3, dash line 301 represents lane, and curve 302 represents location of the vehicle with respect to the center of the road of the vehicle. Curve 303 represents whether or not side brake is applied by the BSDS and the ESC module. Referring to the curve 302, since when Time is around 5 second, 16 second and 27 second, the vehicle moves from the center of the road to the upper lane (in the graph). When Time is around 7 second, 18 second and 29 second, the vehicle reaches the lane, while the BSDS applies side brake to the driving system when Time is around 6~7 second, 17~18 second, 28.5~29.5 second. By this, the vehicle rather approaches to the opposite lane when Time is around 10 second, 21 second, and 33 second. This indicates that so-called "overshoot over the lane center" has occurred, because, while the situation simply needs the LKAS to stably control the vehicle, both the side brake by the BSDS and the steering control by the LKAS are performed at once.

Further, the lower graph in FIG. 3 corresponds in time to the upper graph in FIG. 3. Curve 303 indicates whether or not the side brake is applied. Curve 304 indicates yaw-rate of the vehicle, and curve 305 indicates heading angle of the vehicle. Referring to the curve 304, when Time is around 6~7 second, 17~18 second, 28.5~29.5 second when the side brake is applied, the yaw-rate rapidly is increased even up to about −4°/sec. This means that the driver in the vehicle feels less comfortable or may even feel anxiety due to rapid direction changes.

Figure 4:
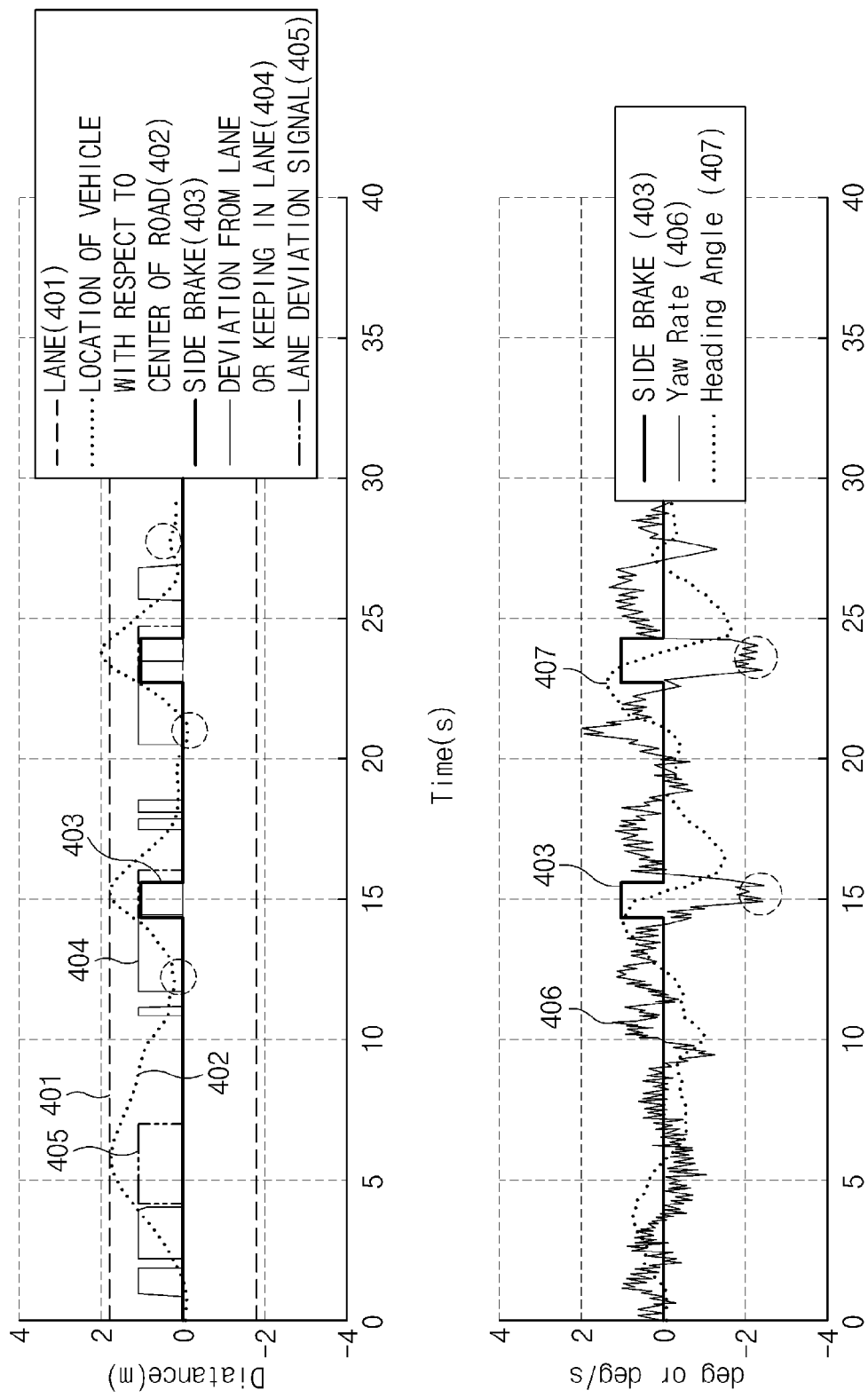
FIG. 4 is a view provided to explain an integrative control according to various exemplary embodiments of the present disclosure.

FIG. 4 is a view provided to explain an integrative control according to various exemplary embodiments of the present disclosure.

Referring to upper graph of FIG. 4, dash line 401 represents lane, and curve 402 represents a location of the vehicle with respect to the center of the road of the vehicle. Curve 403 represents whether or not side brake is applied by the ABSD system 101 and the ESC module 102. Curve 404 indicates whether or not the vehicle is deviated from its lane, and curve 405 indicates a lane deviation signal. Referring to curve 402, the vehicle moves from the center of the road to the upper lane (in the graph) since when Time is around 2 second, 13 second, 21 second. The vehicle reaches the lane at Time around 6 second, 15 second, 24 second, and under control of the integrative control module 106, the ABSD system 101 applies the side brake to the driving system 105 when Time is around 14.5~15.5 second and 23.5~24.5 second. That is, although the vehicle reaches the lane around Time 6 second, side brake is not applied to the driving system 105, while the driving system 105 is only under steering control by the LKAS 103 and the MDPS module 104. Further, because the ABSD system 101 and the LKAS 103 are integratively controlled, the "overshoot over the lane center" does not appear across the entire graphs.

Further, the lower graph in FIG. 4 corresponds in time to the upper graph in FIG. 4. Curve 403 indicates whether or not the side brake is applied. Curve 406 indicates yaw-rate of the vehicle, and curve 407 indicates heading angle of the vehicle. Referring to curve 406, at Time around 14.5~15.5 second and 23.5~24.5 second when the side brake is applied, the yaw-rate is rapidly increased, but is maintained at about −2°/sec. This is only about the half of the degree that is experienced in the related art, and the driver can have enhanced comfortableness as much as the change of yaw-rate is decreased.

As described above, according to the exemplary embodiments of the present disclosure, it is possible to prevent rapid change in the steering and velocity of the vehicle, which is occurred in the related art due to the side brake control that is still performed by the BSDS although the vehicle can be stably controlled by the LKAS alone. As a result, excessive control that exceeds the center of the road is prevented, and lateral driving stability of the vehicle is further enhanced.

Meanwhile, the integrative control methods according to various exemplary embodiments of the present disclosure are writable as a computer program. Codes and code segments for constituting the program can be easily envisioned by a computer programmer in the art. The written program is stored at a computer-readable recording medium (i.e., information storage medium) so that the methods of the present disclosure are implemented by being read and executed by a computer. The recording medium encompasses all forms of recording medium that are readable by a computer.

The specific implementations explained herein are only exemplary embodiments and these are not intended as limiting the scope of the present disclosure by any means. For simplicity, the related circuit configurations, control systems, software, and other functional aspects of the systems may not be described. Further, connection by lines or connecting members among the constituent elements illustrated in the drawings exemplify functional connection and/or physical or circuitry connections, which may be, in the actual apparatus, represented by a variety of replaceable or additional functional connections, physical connections, or circuit connections. Further, unless specifically mentioned with the expressions such as "essential" or "critical", these may not be essentially necessary constituent elements for the implementation of the present disclosure.

As used herein (and in the claims in particular), "said" or similar referring expression may correspond to both singular form and plural form. Further, (unless otherwise specified), a range described herein is inclusive of the present disclosure adopting individual values falling into the range and it is equivalent to as specifying each of the individual values that constitute the range. As used herein, all the examples or exemplary expressions (e.g., for example, such as) simply intend to specifically describe the present disclosure in detail, but the above-described examples or exemplary expression do not limit the scope of the disclosure, unless otherwise limited in the claims. Further, those skilled in the art will understand that various modifications, combination and changes may be configured according to conditions and factors of design in the appended claims or equivalent thereof.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. An integrative control system, comprising:
   a driving system performing steering and driving of a vehicle;
   a blind spot detection (BSD) module calculating a time-to-collision against another vehicle, when said another vehicle is positioned in a blind spot of the vehicle;
   a lane keeping assist (LKA) module
      determining whether or not the vehicle is deviated from a lane, and
      sending a steering angle control command to the driving system upon determination that the vehicle is deviated from the lane; and
   an integrative control module
      calculating an estimated lateral distance when the vehicle is deviated from the lane and said another vehicle is positioned in the blind spot, by using the time-to-collision, and
      instructing the BSD module to send a side brake control command to the driving system and
      instructing the LKA module to send the steering angle control command to the driving system when the estimated lateral distance is equal to or greater than a predetermined value.

2. The integrative control system according to claim 1, wherein, when the estimated lateral distance is less than the predetermined value, the integrative control module only instructs the LKA module to send the steering angle control command to the driving system.

3. The integrative control system according to claim 1, wherein the BSD module sends the side brake control command to the driving system through an electronic stability control (ESC) module.

4. The integrative control system according to claim 1, wherein the LKA module sends the steering angle control command to the driving system through a motor driven power steering (MDPS) module.

5. The integrative control system according to claim 1, wherein the integrative control module calculates the estimated lateral distance using the time-to-collision, velocity of the vehicle, heading angle of the vehicle, yaw-rate of the vehicle, and curvature of the lane.

6. The integrative control system according to claim 1, wherein the BSD module calculates the time-to-collision against said another vehicle, only when velocity of the vehicle is equal to or greater than a predetermined velocity.

7. An integrative control method of a blind spot detection system (BSDS) and a lane keeping assist system (LKAS) mounted to a vehicle, comprising:
   detecting, by the LKAS, a deviation from a lane;
   detecting, by the BSDS, positioning of another vehicle in a blind spot of the vehicle and
   calculating a time-to-collision against said another vehicle;
   calculating an estimated lateral distance using the time-to-collision; and
   when the estimated lateral distance is equal to or greater than a predetermined value,
     instructing the BSDS to send a side brake control command to a driving system and
     instructing the LKAS to send a steering angle control command to the driving system.

8. The integrative control method according to claim 7, further comprising, when the estimated lateral distance is less than the predetermined value, only instructing the LKAS to send the steering angle control command to the driving system.

9. The integrative control method according to claim 7, wherein the side brake control command is sent to the driving system through an electronic stability control (ESC) module.

10. The integrative control method according to claim 7, wherein the steering angle control command is sent through a motor driven power steering (MDPS) module.

11. The integrative control method according to claim 7, wherein the estimated lateral distance is calculated based on the time-to-collision, velocity of the vehicle, heading angle of the vehicle, yaw-rate of the vehicle, and curvature of the lane.

12. The integrative control method according to claim 7, wherein the time-to-collision against said another vehicle is calculated only when velocity of the vehicle is equal to or greater than a predetermined velocity.

* * * * *